Feb. 19, 1935. F. W. MEREDITH ET AL 1,992,086
CONTROL APPARATUS FOR AEROPLANES AND OTHER DIRIGIBLE OBJECTS
Filed May 23, 1934
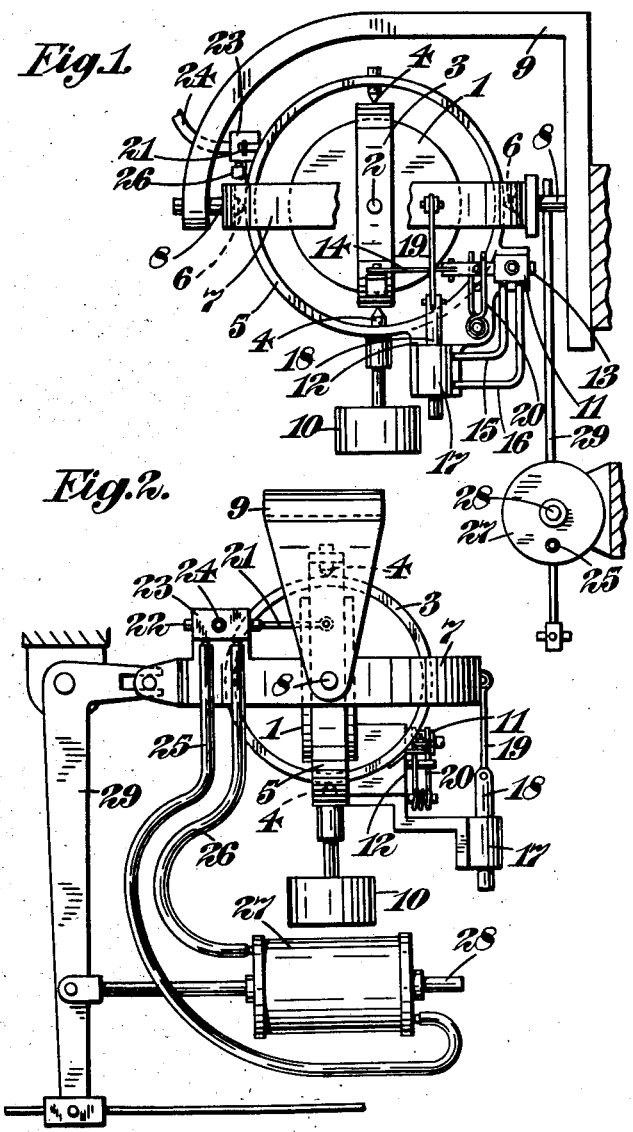

Patented Feb. 19, 1935

1,992,086

UNITED STATES PATENT OFFICE 1,992,086

CONTROL APPARATUS FOR AEROPLANES AND OTHER DIRIGIBLE OBJECTS

Frederick William Meredith, South Farnborough, and Philip Andrew Cooke, London, England Application May 23, 1934, Serial No. 727,204
In Great Britain December 9, 1933

6 Claims. (Cl. 244—29)

This invention relates to automatic control systems for aeroplanes and other dirigible objects (hereinafter intended to be included in the term "aeroplane" where the context so permits) and more particularly to means for controlling the ailerons or other organs of lateral control of an aeroplane.

It has previously been proposed to control the lateral movements of an aeroplane through the ailerons by the use of a gyroscope of which the rotor axis is vertical but it has been found difficult to define the vertical with sufficient accuracy by this means.

It has also been proposed to control the lateral movements of an aeroplane through the ailerons by means of a universally mounted pendulous gyroscope in which the rotor spins about a horizontal axis extending transversely of the aeroplane. In this prior proposal the gyroscope also controlled the rudder of the aeroplane in such a manner that any displacement of the axis of spin of the rotor from a predetermined transverse direction resulted in movement of the rudder. With this arrangement the gyroscope will only be in equilibrium when its axis of spin extends transversely of the aeroplane so that the axis of spin must follow the movements of the aeroplane. With this prior apparatus manually-controlled means is provided for applying a torque to the gyroscope to counter any tendency for the axis of spin to precess about the longitudinal axis of the aeroplane. This means is not automatic and if not correctly adjusted will not prevent precession of the gyroscope occurring with the consequence that the aeroplane will fly along a straight course with an undesired bank.

The object of the present invention is to provide an improved control system of the type referred to in the preceding paragraph in which automatic means is provided for preventing the axis of spin from deviating from the horizontal and for causing it to follow the movements of the aeroplane when the latter turns about a vertical axis.

According to the present invention apparatus for controlling the lateral movements of an aeroplane comprises a pendulous gyroscope whose rotor is mounted to spin about a horizontal axis transverse to the aeroplane in an inner ring pivoted about a vertical axis in an outer ring which in turn is pivoted about a horizontal axis extending longitudinally of the craft and which gyroscope has its centre of gravity below its axis of spin and is arranged to actuate the ailerons of the aeroplane in accordance with movement of the axis of spin in a vertical plane but not to control the rudder or elevator of the aeroplane. Further according to the invention the moment of the gyroscope and the angular momentum of its rotor are so related to the forward velocity of the aeroplane that the gyroscope will, when the aeroplane moves on a curved course, precess in azimuth under the influence of centrifugal force at substantially the same angular velocity as the aeroplane is turning and there is provided means tending to maintain the inner and outer rings in a predetermined angular relationship to one another and to the aeroplane. Preferably, the said means comprises a device such as a spring arranged to apply a torque to the inner ring, when the latter moves relatively to the outer ring about its pivotal axis, and in the opposite direction to that of the movement, and mechanism responsive to relative displacement between the inner and outer rings to apply to the outer ring a torque proportional to the displacement.

One form or arrangement of apparatus according to the present invention is illustrated more or less diagrammatically and by way of example in the accompanying drawing in which Figures 1 and 2 are, respectively, side and front elevations of a universally mounted air driven gyroscope for controlling the rolling movements of an aeroplane. The means for driving the gyroscope are not illustrated but may be constructed according to any suitable form.

In the construction shown, the gyroscope comprises a rotor (1) whose axis of spin (2) is horizontal and lies athwartship of the aeroplane. The rotor is carried in an inner vertical gimbal ring (3), the plane of which also lies athwartship. The inner gimbal ring (3) is mounted by vertical pivots (4) in an outer gimbal ring (5), the plane of which is orthogonal to the inner gimbal ring (3) and also vertical. The outer gimbal ring (5) is carried by horizontal fore-and-aft pivots (6) about the roll axis of the aeroplane in a follow-up frame (7), which is mounted on plain bearings (8) (also on the roll axis) on a main casting or base plate (9), which is fast on the aeroplane.

Rigidly attached to the outer gimbal ring (5) and carried beneath it is a weight (10), so that the centre of gravity of the gyroscope system lies below the fore-and-aft axis of suspension (6) of the outer gimbal ring. The function of the weight in conjunction with other parts hereinafter described is to enable the gyroscope to define a vertical plane in the manner which will be explained.

A piston valve (13) in a valve cylinder (11), which is attached to an extension (12) of the outer gimbal ring (5), is sensitive to and serves to detect relative movement between the inner and outer gimbal rings. The piston valve (13) is connected by a link (14) to the inner gimbal ring (3), and relative movement between the inner and outer gimbal rings causes the piston valve (13) to admit compressed air through one or other of the conduits (15) and (16) to a precessing cylinder (17).

The precessing cylinder (17), which is mounted on the extension (12) of the outer gimbal ring (5), contains a precessing piston (18), which is connected by a link (19) to the follow-up frame (7). The precessing piston (18) is so arranged as to be capable of applying a torque about the outer gimbal ring fore-and-aft axis (6) between the outer gimbal ring and the follow-up frame (7). This torque is controlled both in magnitude and sign by the operation of the piston valve (13).

A bifurcated spring (20) mounted on the extension (12) of the outer gimbal ring (5) engages an abutment on the piston valve (13), and is adapted to apply a restoring torque reaction between the gimbal rings when the inner gimbal ring is displaced from its normal orthogonal position relative to the outer gimbal ring.

By means of the mechanism above described, the outer gimbal ring (5) is maintained in the vertical plane in a manner which will be described later.

The gyroscope system is used to control the ailerons of the aeroplane by connecting the outer gimbal ring (5) by means of a link (21) to a piston valve (22) operating in a valve cylinder (23) rigidly attached to the follow-up frame (7). Relative movement between the piston valve (22) and the valve cylinder (23) causes compressed air, which is supplied to the valve cylinder through a flexible conduit (24), to be admitted through one or other of two flexible conduits (25) and (26) to the appropriate end of a servo-motor cylinder (27), which is fast on the aeroplane and contains a double action piston. The servo-motor piston rod (28) is connected in any suitable manner to the ailerons. In the operation of the arrangement, relative movement about the fore-and-aft axis (6) between the aeroplane and the gyroscope system causes the valve (22) to admit compressed air to one end or the other of the servo-motor cylinder so as to apply correcting movements to the ailerons to control rolling movements of the aeroplane. In order to obtain a follow-up effect in which the movements of the ailerons are quantitatively controlled by the displacement of the outer gimbal ring relative to the aeroplane, the servo-motor piston rod (28) is connected by a lever (29), which is fulcrumed on the aeroplane, to the follow-up frame (7) in such a way that the movement of the piston rod (28) produces a rotation of the follow-up frame about its fore-and-aft bearings (8).

Considering the use of the mechanism above described during straight unaccelerated flight, let it be supposed that the pendulously weighted outer gimbal ring (5) is displaced from the vertical plane. The pendulous weight (10) will then produce a gravity torque about the outer gimbal ring fore-and-aft axis (6), and this torque will cause the gyro rotor together with the inner gimbal ring to precess in azimuth.

Precession of the inner gimbal ring (3) in azimuth relative to the outer gimbal ring (5) operates the piston valve (13) and thereby causes the precessing piston (18) to apply a torque reaction between the follow-up frame (7) and the outer gimbal ring (5) in such a sense as to oppose the gravity torque due to the pendulous weight (10). The azimuthal precession of the inner gimbal ring (3) is thus limited to that small angle for which the displacement of the valve parts (11) and (13) suffices to cause the precessing piston (18) to apply the appropriate reaction as described above.

In addition to the sequence of operations described in the preceding paragraph, the precession of the inner gimbal ring (3) in azimuth causes the spring mechanism (20) to apply a small restoring torque about the vertical axis (4) of the inner gimbal ring. This torque produces a precession of the outer gimbal ring (5) about its fore-and-aft axis (6) thus returning the outer gimbal ring and the pendulous weight back to the vertical plane. Thus, if the outer gimbal ring is displaced in either direction it will subside gradually to the vertical plane.

Considering the forces acting on the pendulous weight (10) during steady curved flight, it is seen that in addition to the gravitational force, there is also a centrifugal force which exerts a torque about the outer gimbal ring fore-and-aft axis (6). This torque, which is proportional to the forward speed and rate of turn of the aeroplane, causes a precession of the gyro rotor (1) and the inner gimbal ring (3) in azimuth.

The relationship between the moment of the weight, the angular momentum of the gyro rotor and the forward speed of the aeroplane is, therefore, suitably chosen so that the rate of precession of the inner gimbal ring (3) due to centrifugal force on the weight (10) will be equal to the rate of turn of the aeroplane, and, as a result, no relative displacement will occur. Thus, if the outer gimbal ring (5) lies in the vertical plane, it will not be displaced from that plane by the action of centrifugal force during a turn.

The mechanism described herein will cause the aeroplane to fly on a curved course without banking. If the forward speed of the aeroplane is not correctly related with the moment of the weight (10) and the angular momentum of the rotor, the rotor and inner ring will precess at a different rate to the angular velocity of the aeroplane and the inner ring will become displaced from the outer ring. This will result in a movement of the piston valve (13) and the precessing motor (17, 18) will apply a torque to the outer ring so as to cause it to precess. This will alter the total acceleration field acting on the weight (10) by introducing a gravitational component. The precession will continue until the torque due to the total acceleration field is exactly that required to precess the inner ring and the rotor at the same velocity as the outer ring is turning with the aeroplane.

The rotor axis 2 has now departed from the horizontal so that the aeroplane will be banked. The amount of bank is very small and remains constant during sustained curved flight. When the aeroplane is again taken out of curved flight into straight flight, the apparatus acts to restore the gyroscope to its normal position with the axis of spin (2) horizontal in the manner described previously. The present invention is intended to cause the aeroplane to fly flat (that is without banking) under all conditions. The apparatus could, however, be modified so that the aeroplane is banked to the appropriate extent in curved flight by providing means for applying a torque between the follow-up frame (7) and the outer ring (5), which torque is proportional to the angular velocity at which the aeroplane is turning. This torque, by modifying the effect of the field of acceleration on the gyroscope, will cause the precession of the inner ring (3) relatively to the outer ring (5) which in turn will cause the precession of the outer ring and a precession of the rotor axis in a vertical plane. The rotor axis (2) would thus be displaced from the horizontal during curved flight and the aeroplane would be banked.

We claim:—

1. Apparatus for controlling the lateral movements of an aircraft comprising a gyroscope which has an outer ring pivoted about a horizontal axis extending longitudinally of the aircraft and lying substantially in a vertical plane, an inner ring pivoted about a substantially vertical axis in the outer ring and lying in a vertical plane transverse to the aircraft, a rotor mounted in the inner ring to spin about a horizontal axis extending transversely of the aircraft, mechanism responsive to deviation of the axis of spin in a vertical plane from the horizontal for adjusting the ailerons of the aircraft in accordance with such deviation, means biasing the inner and outer rings in a predetermined angular relationship to one another and to the aircraft, and a weight carried by the gyroscope and causing its centre of gravity to lie below the axis of spin.

2. Apparatus for controlling the lateral movements of an aircraft comprising a pendulous gyroscope having an outer ring pivoted about a horizontal axis and lying in a vertical plane with its centre of gravity below its horizontal pivotal axis, an inner ring pivoted in the outer ring about a vertical axis, a rotor mounted to spin in the inner ring about a horizontal axis substantially at right-angles to the first-mentioned horizontal axis, means responsive to relative displacement between the inner and outer rings in azimuth for applying a torque to the outer ring about its horizontal pivotal axis, means operable as the result of relative displacement between the inner and outer rings in azimuth to apply a torque to the inner ring proportional to the displacement and in the opposite direction, and mechanism responsive to relative angular movement in a vertical plane between the axis of spin and a datum line in the aircraft for adjusting the ailerons of the aircraft to correct such movement.

3. Apparatus for controlling the lateral movements of an aircraft according to claim 2, wherein the moment of the outer ring about its pivotal axis and the angular momentum of the rotor are so chosen in relation to the angular velocity of the aircraft in which the apparatus is to be used that the gyroscope will precess in azimuth under the influence of centrifugal force at an angular velocity substantially equal to the angular velocity of the turning movement producing the centrifugal force.

4. Apparatus for controlling the lateral movements of an aircraft, comprising a frame pivoted about a horizontal axis, an outer ring pivoted in said frame about the said horizontal axis and lying in a vertical plane with its centre of mass located below its pivotal axis, an inner ring pivoted in the outer ring about a vertical axis and disposed substantially at right angles to the outer ring, a rotor mounted in the inner ring to spin about a horizontal axis at right angles to the first-mentioned horizontal axis, means for detecting angular movement of the inner ring relatively to the frame about the first-mentioned horizontal axis, a motor controlled by said means and arranged to operate the ailerons of an aircraft in accordance with such movement, an operative connection between the motor and the frame by which the former adjusts the frame in a direction opposite to that of the said movement, a device for detecting relative angular movement between the inner and outer rings in azimuth, a precessing motor connected to the outer ring and the frame and operable to apply a torque to the outer ring under the control of the device for detecting movement between the inner and outer rings and in proportion to said movement and a spring connected between the inner and outer rings and arranged to apply a torque to the inner ring about its pivotal axis in the outer ring when relative movement occurs between the two rings and in the opposite direction to such movement.

5. Apparatus according to claim 4 wherein the moment of the outer ring about its pivotal axis and the angular momentum of the rotor are so selected that the rotor will, when the apparatus is in use in an aeroplane, be precessed in azimuth by centrifugal force at an angular velocity substantially equal to the angular velocity with which the aeroplane is turning.

6. The combination with an aeroplane, of a gyroscope having a rotor and a universal mounting by which the rotor is supported to spin about a horizontal axis transverse to the length of the aeroplane and which comprises a gimbal ring pivoted about a horizontal axis extending in the direction of the length of the aeroplane and located above the centre of mass of the said ring and the parts supported thereby to an extent so chosen in relation to the momentum of the rotor and the normal forward velocity of the aeroplane that the gyroscope will precess, under the influence of centrifugal force resulting from the aeroplane turning about a vertical axis and acting on said mass, at substantially the same rate as the aeroplane is turning, means biasing the said ring to the position in which the axis of spin is horizontal, means co-operating with said ring to actuate the ailerons, when angular deviation occurs in a vertical plane between the axis of spin and a fixed datum line in the aeroplane, to turn the aeroplane in the opposite sense to that of said deviation.

FREDERICK WILLIAM MEREDITH.
PHILIP ANDREW COOKE.